(12) United States Patent
Musante et al.

(10) Patent No.: US 6,931,427 B2
(45) Date of Patent: Aug. 16, 2005

(54) METHOD AND APPARATUS FOR DISCOVERING DATA SERVICES IN A DISTRIBUTED COMPUTER SYSTEM

(75) Inventors: Mark J. Musante, Westford, MA (US); Chhandomay Mandal, Nashua, NH (US); Howard A. Newman, Arlington, MA (US); Peter J. Wagener, Somerville, MA (US); Melora L. Goosey, Andover, MA (US); Roberta A. Pokigo, Billerica, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 741 days.

(21) Appl. No.: 10/003,212

(22) Filed: Oct. 31, 2001

(65) Prior Publication Data

US 2003/0084116 A1 May 1, 2003

(51) Int. Cl.[7] .............................................. G06F 15/16
(52) U.S. Cl. ........................ 709/201; 709/202; 709/213
(58) Field of Search ................................ 709/201–203, 709/213–215, 217

(56) References Cited

U.S. PATENT DOCUMENTS 6,772,178 B2 * 8/2004 Mandal et al. .............. 707/204

* cited by examiner

Primary Examiner—Mehmet B. Geckil
(74) Attorney, Agent, or Firm—Kudirka & Jobse, LLP (57) ABSTRACT

A dedicated service finder runs on each host on which data management services run. This service finder caches handles that allow clients to manage the corresponding service and keeps track of other hosts that are also running the service finder. In one embodiment, the service finder registers itself with an existing lookup service so that a client can perform a single lookup for the service finder and then obtain other services from it. Accordingly, only a single lookup is required to obtain all the services running on a specific host. In accordance with another embodiment, the service finder monitors events generated by existing lookup services that occur when other service finders register with the lookup services. In this manner, the service finder can maintain a list of other hosts that have service finders running on them. This arrangement allows a client that has located one service finder to retrieve from that service finder information concerning other hosts and data services running on those hosts.

29 Claims, 4 Drawing Sheets

METHOD AND APPARATUS FOR DISCOVERING DATA SERVICES IN A DISTRIBUTED COMPUTER SYSTEM

FIELD OF THE INVENTION

This invention relates to management of data services, such as data replication, data imaging and caching services and, in particular, to the discovery of such services in networked computer systems.

BACKGROUND OF THE INVENTION

In a large, distributed computer system connected by a network, management personnel and resources typically manage the system from a system console using a command line interface (CLI) or a graphic user interface (GUI). These interfaces directly, or indirectly, control various data management services, such as data replication, imaging, caching and remote notification services. In order to control these services the CLI or GUI must discover which data management services, or combination of services are running in a particular host system and which host systems in a distributed computer system have data management services installed and running. In a small simple network, the location process is also relatively simple, however, in large distributed systems, where there are many clients and data services, the lookup process becomes much more complex.

One prior art method of dealing with this lookup problem is called Jini™ Network Technology, which is available from Sun Microsystems, Inc. 901 San Antonio Road, Palo Alto, Calif. 94303 (Jini is a trademark of Sun Microsystems, Inc.) Jini™ technology consists of an infrastructure and a programming model that allow clients to find and interconnect with services in a distributed network. Network services run on top of the Jini software architecture and are located by means of "lookup" services that reside on lookup servers.

A lookup service provides a central registry of services available within a service group of clients and services that are operating with the Jini™ architecture. Each lookup service maintains a flat collection of service items, where each service item represents an instance of a service available within the service group. The item contains a remote invocation stub (if the service is implemented as a remote object) or other object (if the service makes use of a local proxy) that programs use to access the service, and an extensible collection of attributes that describe the service or provide secondary interfaces to the service.

When a new service is created (for example, when a new device is added to the service group), the service registers itself with a lookup service associated with the group, providing a service item with an initial collection of attributes. For example, a printer might include attributes indicating speed (in pages per minute), resolution (in dots per inch), and whether duplex printing is supported. Among the attributes might be an indicator that the service is new and needs to be configured.

The lookup service also has an event service and clients can register an interest in the occurrence of selected events with the event service in a conventional manner. In particular, when services join or leave a lookup service, events are signaled, and clients that have registered an interest in such events get notifications when new services become available or old services cease to be active.

The service attributes can be used in different manners. For example, an administrator might use the event mechanism provided by the lookup service to receive notifications as new services are registered. To configure these new services, the administrator might look for an attribute that provides an applet for this purpose. The administrator might also use an applet to add new attributes, such as the physical location of the service and a common name for it; the service would receive these attribute change requests from the applet and respond by making the changes at the lookup service.

When the aforementioned CLI or GUI programs need to control a particular data service, they can use the Jini™ lookup service to find an instance of that data service. A client program finds services by looking for a service item with attributes that match an attribute specification through a process called "discovery."

The discovery process begins when a client attempts to obtain references to one or more lookup services. Specifically, the client issues a multicast that requests references to nearby lookup services. Any lookup services that receive the request connect to the client response server and provide service ID references to themselves.

Once service IDs to the lookup services have been obtained, a client can look for a matching service item. An attribute match can be made based on the specific data types for the Java™ programming language implemented by the service as well as the specific attributes attached to the service. Although the collection of service items in a lookup service is flat, a variety of hierarchical views can be imposed on the collection by aggregating items according to service types and attributes. The lookup service provides a set of methods to enable incremental exploration of the collection. When an appropriate service is found, the client can download any code it needs in order to talk to the service, thereby learning how to talk to the service implementation via the service API.

The Jini™ lookup service performs well, however, the lookup processing is complex and time consuming. If the lookup process must be used to locate a particular data management service each time a CLI or GUI for that particular service is invoked, the performance of the data management service is reduced.

Therefore, there is a need to provide a simple, fast way to discover data management services on hosts, both local and remote and to reduce the time needed to make such a lookup.

SUMMARY OF THE INVENTION

In accordance with the principles of the invention, a dedicated service finder runs on each host on which data management services run. This service finder caches handles that allow clients to manage the corresponding service and keeps track of other hosts that are also running the service finder.

In one embodiment, the service finder registers itself with the existing lookup service so that a client can perform a single lookup for the service finder and then obtain other services from it. Accordingly, only a single lookup is required to obtain all the services running on a specific host.

In accordance with another embodiment, the service finder monitors events generated by existing lookup services that occur when other service finders register with the lookup services. In this manner, the service finder can maintain a list of other hosts that have service finders running on them. This arrangement allows a client that has located one service finder to retrieve from that service finder information concerning other hosts and data services running on those hosts.

In another embodiment, the service finder is part of a three-tiered data imaging system is used on a distributed computer system connected by a network. The lowest tier comprises management facade software running on each host machine that communicates with a set of low-level kernel routines that actually perform the data management services. The middle tier is a set of federated Java beans that communicate with each other, with the management facades and with the upper tier of the system. The upper tier of the inventive system comprises the CLI and GUI presentation programs that can be directly manipulated by management personnel to view and control the system.

In yet another embodiment, the service finder is implemented as a federated bean that communicates with the other federated beans in a three-tiered management system.

BRIEF DESCRIPTION OF THE DRAWINGS

The above and further advantages of the invention may be better understood by referring to the following description in conjunction with the accompanying drawings in which.

DETAILED DESCRIPTION

A data services discovery system constructed in accordance with the principles of the invention operates in a data services system that comprises three layers or tiers. The first, or upper, tier is a presentation layer with which a manager interacts at a single host location. The upper tier, in turn, interacts with the middle tier comprised of a plurality of federated beans, each of which performs specific tasks in the system. The federated beans can communicate with each other both in the same host and in other hosts via a network connecting the hosts. Some of the beans can communicate with the lowest tier that comprises the aforementioned kernel modules that actually perform the data services. In this manner an entire data services system can be configured and managed from a single location.

Figure 1:
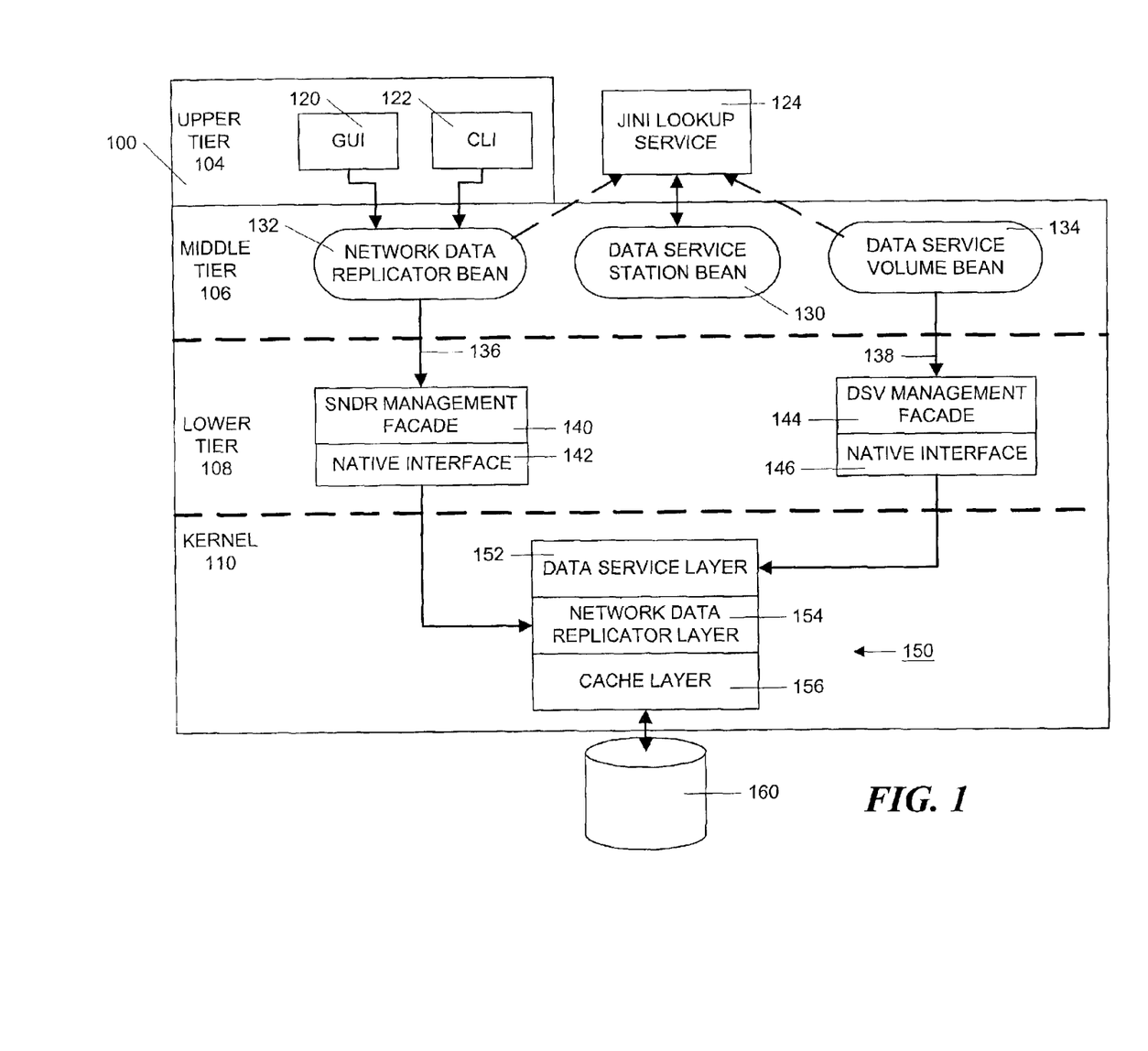
FIG. 1 is a block schematic diagram of a host computer system showing the three-tiered data service management system incorporating the data service discovery arrangement of the present invention.

FIG. 1 shows a host system 100 that illustrates the contents of the three tiers running in the memory of a single host. The inventive data service system comprises three layers or tiers: an upper tier 104, a middle tier 106 and a lower tier 108. The upper tier 104 is a presentation level that can be implemented with either a graphical user interface (GUI) 120 or a command line interface (CLI) 122. A manager interacts with this level, via the GUI 120 or CLI 122, in order to create, configure and manage a data services system. The GUI 120 and the CLI 122, communicate with a federated bean that actually controls a particular data service. For example, in FIG. 1, the GUI 120 and the CLI 122 communicate with a bean 132 running in the host 100 where the GUI 120 and CLI 122 are running as indicated in FIG. 1. Bean 132 implements a network data replication data service.

The middle tier 106 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at http://www.jiro.com, which manual is incorporated by reference in its entirety. The Jiro™ lookup service is implemented by means of the Jini™ lookup service described above.

The data services lookup system constructed in accordance with the principles of the present invention is implemented by a federated bean called a data service station (DSS) bean 130. The data services themselves are implemented by other federated beans running in host 100. These other beans include an SNDR bean 132 and a data services volume (DSV) bean 130. SNDR bean 132 implements a network data replication service and DSV bean 130 locates, configures and manages volumes used by the SNDR bean. Other beans may implement other data services, including a data imaging service a configuration service, a notification service and a caching service. These other beans and services are not shown in FIG. 1 in order to simplify the figure. The data replication bean 132 communicates with the DSV bean 130 whenever data replication bean 132 starts or stops using a volume managed by DSV bean 130.

In order to manage a network data replication system, data replication bean 132 communicates with a data replication layer 154 in the layered stack 150, via a data replication management facade 144 and a native interface 146. The data replication capability is actually implemented in the kernel layer 110 shown running in host 100 in FIG. 1. In particular, access by the host 100 to a resource 160, which can be a data storage component, is provided by a layered stack 150 comprising a data service volume layer 152, a network data replication layer 154 and a cache layer 156 and may also include other layers (not shown in FIG. 1). Application programs running in host 100 and the host file system access resource 160 though the layered stack 150 and layers 152–156 cooperate to implement the various data services. For example, the data service volume layer 152 places itself between device drivers in the normal data path and shunts I/O information through the other data service layers 154 and 156.

The data services layers would generally by implemented in platform-specific code, for example, in C routines, that expose application programmer interfaces (APIs) that can be accessed only from the host in which the layer is installed. In order to provide for remote management capability in accordance with the principles of the invention, the data replication layer 154 and the data service volume layer 152 are controlled by software running on the lower tier 108 of the data services system. The lower tier includes native interfaces 142 and 146 that convert the APIs exported by the layers 154 and 152 into a platform-independent language, such as Java™.

The native interfaces 142, 146 are, in turn, controlled by management facades 140 and 144 that provide the required remote management capability. In particular, the management facades 140, 144 provide a means by which the respective layers 154 and 152 can be accessed and managed as Jiro™ services. The management facades are essentially object-oriented models of the kernel-resident layers 154 and 152 and provide a collection of APIs to manage their associated layers.

In accordance with the principles of the invention, a data service station (DSS) bean 130 is provided in the middle tier 106 of each host in the system. The DSS bean 130 is responsible for finding services on the local host 100 as well as finding other DSS beans on remote hosts. Since DSS beans will be installed on all hosts and will be continuously running, a client will be able to find and use data services on any host and will be made aware of services that spontaneously appear or disappear on any host.

In particular, as shown in FIG. 1, when it is installed, the DSS bean 130 registers as both a service and as a remote listener with the Jini lookup service 124. When another data service, such as a network data replication service implemented by network data replicator bean 132 is installed it also registers as a service with the Jini lookup service 124. In accordance with the conventional Jini event mechanism, a notification of this latter registration is sent to the DSS bean 130. The notification contains the name of the newly registered service and a proxy to the service. The name and proxy are cached in the DSS bean 130.

In addition, when a DSS bean on another system registers with the Jini™ lookup service 124, a notification of this latter registration is also sent to the DSS bean 130. This notification also contains the name of the host on which the DSS bean has been installed and an identification of the lookup service that has a proxy to that DSS service. As with other services, the retrieved information is cached in the DSS bean 130.

With the inventive system, if a client wants to use a particular service located on a host somewhere on the network, it need only perform a Jini™ lookup for the DSS bean on its local host. Once the proxy for the local DSS bean is obtained, other services can then be retrieved. For example, if a local service is needed, a proxy for a requested service can be retrieved from the cache in the local DSS bean. This proxy can then be used to directly manipulate the service. Services on other hosts can also be obtained via the local DSS bean. In particular, a user requesting a service on a remote host first retrieves the information regarding the DSS bean running in that host from the cache in the local DSS bean. This information is then used to perform a lookup on the remote host to obtain a proxy to the remote DSS service. Once the proxy to the remote DSS bean is obtained, the user can retrieve a proxy to the remote service from the cache in the remote DSS bean. The remote service can then be manipulated directly. In this manner, a remote service can be located without multiple lookups using the conventional Jini™ lookup mechanism. The time to retrieve a proxy to the service is thus greatly reduced.

Figure 2:
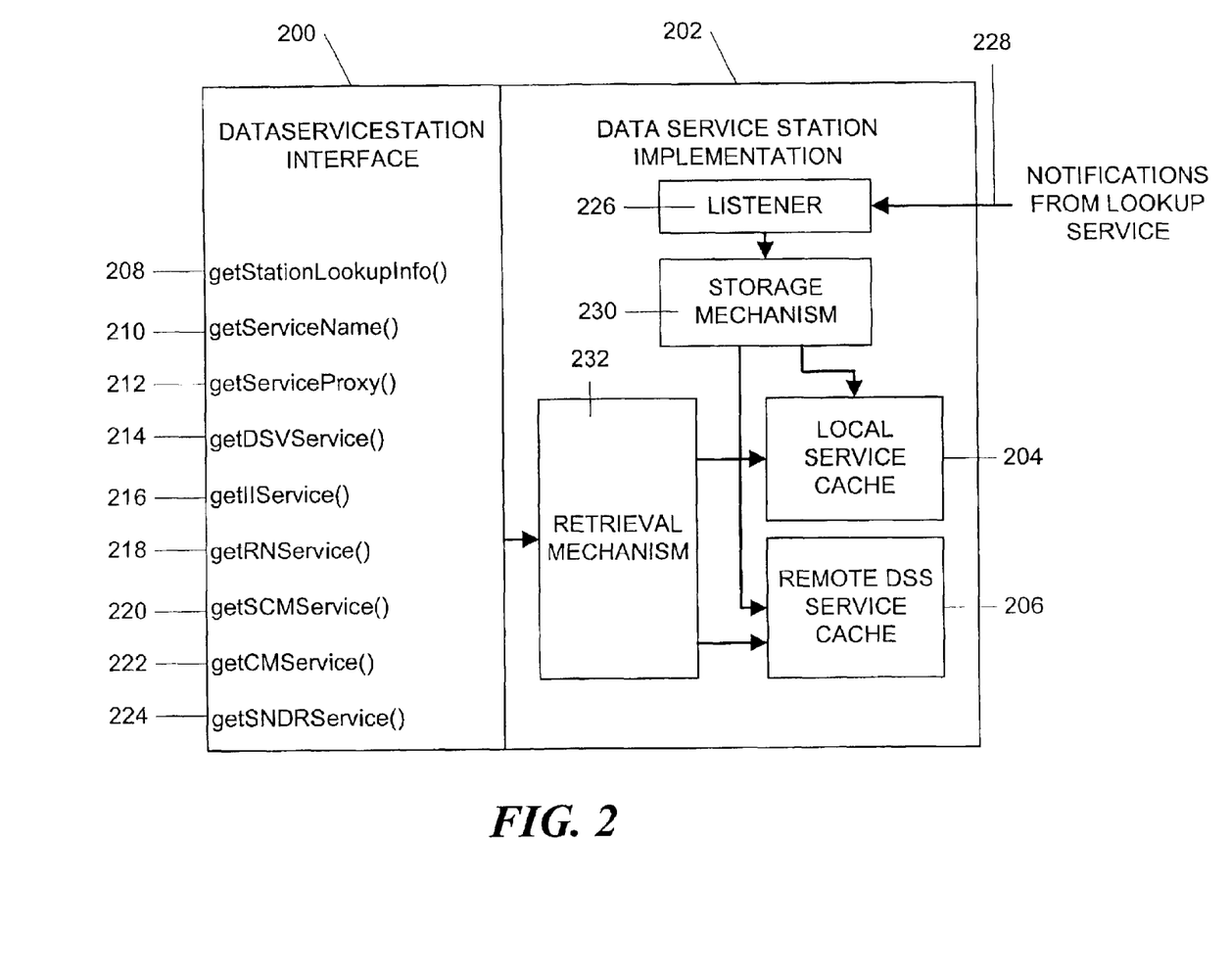
FIG. 2 is a block schematic diagram illustrating the methods in the dataservicestation interface exported by the DSS bean.

FIG. 2 illustrates the construction of the DSS bean. The bean implementation 202 has a listener 226 that, as previously mentioned, is registered with the Jini™ lookup service. Notifications, represented by arrow 228, are generated by the lookup service when data services register with the service. These notifications are received by the listener 226. In the case of a service located on a remote host, the listener extracts the name of a host on which a DSS bean is running and the port number of the lookup service that has a proxy to the DSS bean and stores this information as a DSSTable object in cache memory 206 by means of storage mechanism 230. In the case of a local data service that is running on the same host as the federated bean, a proxy to the service is extracted from the notification by listener 226 and stored in the cache memory 204 by storage mechanism 230.

The DSS bean also exports a bean interface 200 with which a user interacts. This interface 200 is called a DataServicesStation interface and contains several methods that assist a user in locating a service. These methods include the getStationLookupInfo( ) method 208 that retrieves an array of DSSTable objects from a cache 206 in the DSS bean implementation 202 using a retrieval mechanism 232. Each DSSTable object contains the name of a host on which a DSS bean is running and the port number of the lookup service that has a proxy to the DSS bean. This method is used most often when a client is doing an initial lookup for the DSS service, so that the client can see where all of the DSS beans are installed. A client can then use the port number and host name to do a unicast lookup for a DSS bean on a particular host so that the client can then retrieve services on that host.

Once a client has a proxy to a DSS bean on some host, the client can use the getServiceNames( ) method 210, to retrieve the names of data services available on the host from the local cache memory 204 in that host, again using the retrieval mechanism 232. Alternatively, the client can use the getServiceProxy(String service) method 212, passing in a service name as a parameter to retrieve a proxy object to a requested service with retrieval mechanism 232.

Proxy objects to specific services can also be requested using the DSS proxy retrieved from a host. These proxy objects include a proxy to a data volume management service obtained by calling the getDSVService( ) method 214 and a proxy to a data imaging service obtained by calling the getIIService( ) method 216. A proxy can also be obtained to a remote notification service by calling the getRNService( ) method 218 and a proxy to a cache management service can be obtained by calling the getSCMService( ) method 220.

Similarly a proxy to a configuration management service can be obtained by calling a getCMService( ) method 222 and a proxy to a network data replication service can be obtained by calling the getSNDRService( ) method 224. These latter methods all use the retrieval mechanism 232 to retrieve the appropriate objects from the cache memory 204.

Figure 3:
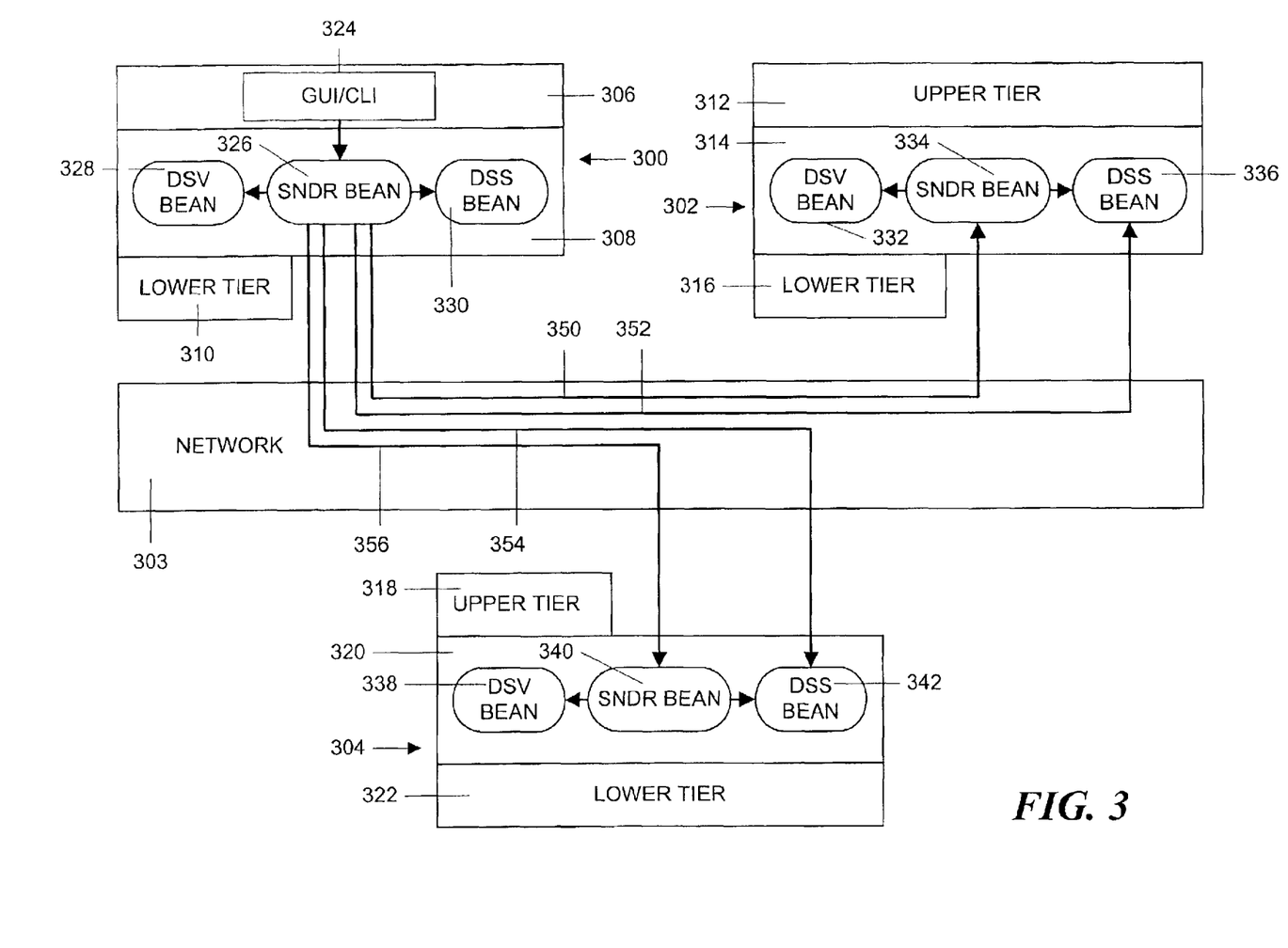
FIG. 3 is a block schematic diagram of an exemplary computer system illustrating how data service clients in one host can locate and control data services in another host to create a distributed network data replication system.
Figure 4:
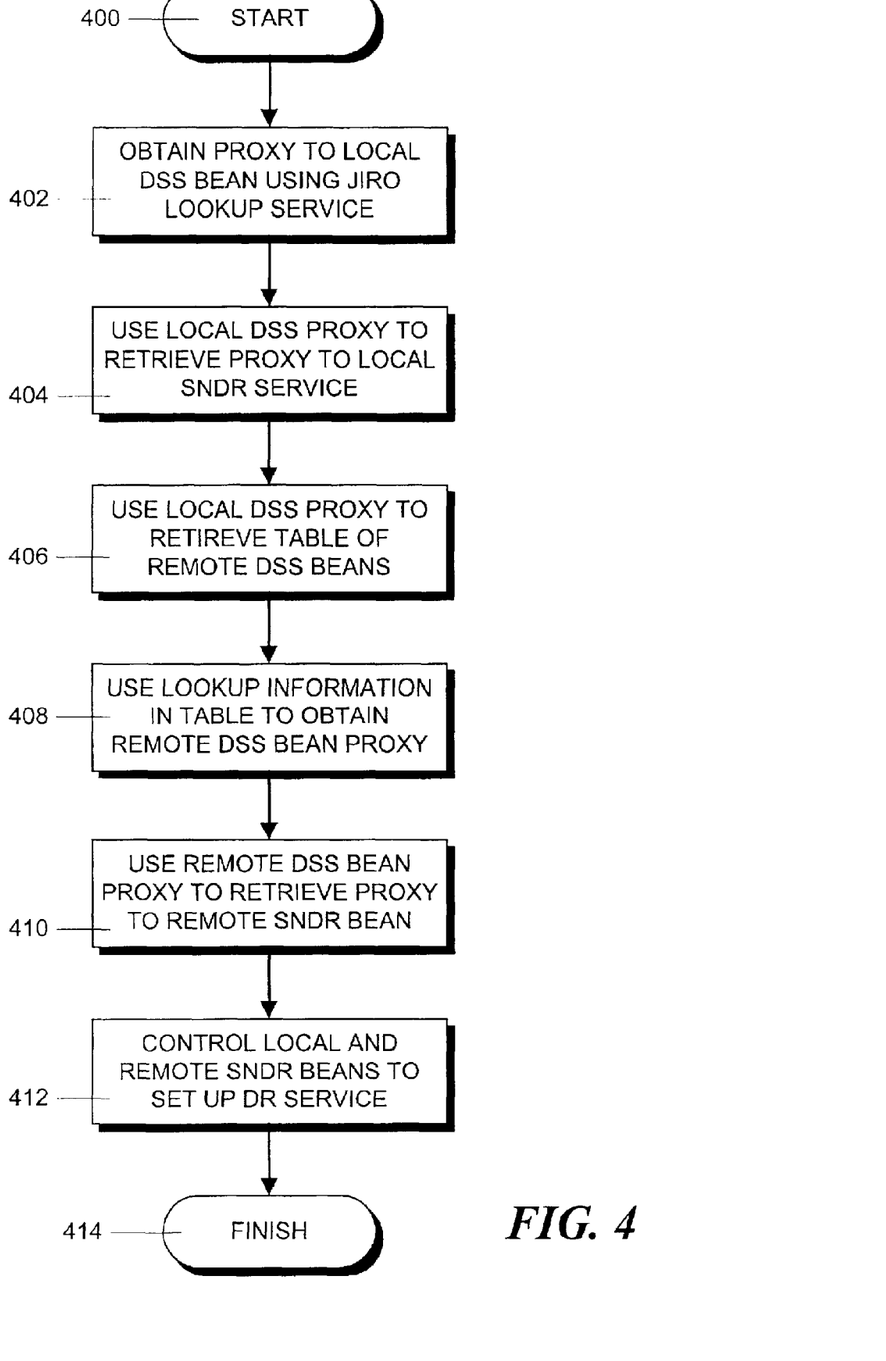
FIG. 4 is an illustrative flowchart showing the steps in locating both a local and remote network data replication service in order to set up the system illustrated in FIG. 3.

An example of the use of the inventive data service system is shown in FIG. 3 and the steps involved illustrated in FIG. 4. In particular, FIG. 3 illustrates a network data replication system that is configured using the inventive data services system. The storage network data replication (SNDR) system is implemented with an SNDR federated bean in much the same manner as the DSS system. By using SNDR federated beans, such as SNDR bean 326, a data replication manager can create and manage an SNDR system from any host in the data replication system. In particular, as described below, the beans can communicate via a network connecting the hosts. FIG. 3 illustrates a system with three hosts 300, 302 and 304 connected by a network 303. Although each of hosts 300, 302 and 304 in this figure include the three tiers illustrated in FIG. 1, only the middle tier has been shown in detail in each host 300, 302 and 304 in order to simplify the diagram.

Host 300 has an upper tier 306, a middle tier 308 and a lower tier 310. A GUI/CLI 324 running in the upper tier 306 of host 300 can be used by a manager to create and manage the data replication system. A manager could also manage the system from a similar GUI/CLI running in upper tiers 312 and 318 of hosts 302 and 304, respectively.

GUI/CLI 324 interacts with an SNDR federated bean 326 running in host 300. As discussed with respect to FIG. 1, bean 326 can interact with a data services volume bean 328 and a data service station bean 330 also running in the middle tier 308 of host 300. In a similar manner, an SNDR federated bean 334 is running in the middle tier 314 of host 302. Bean 334 can interact with a data service volume bean 332 and a data services station bean 336 also running in the middle tier 314 of host 302. Another SNDR federated bean 340 is running in the middle tier 320 of host 304. Bean 340 can interact with a data service volume bean 338 and a data services station bean 342 also running in the middle tier 320 of host 304.

Although a manager interacts with the GUI/CLI running in host 300, using the inventive data services station system, a data replication system can be created involving volumes located in two or more hosts. In order to provide communication between hosts, the SNDR beans in the various hosts can communicate with SNDR beans and data service station beans in other hosts, via the network 303. For example, bean 326 can communicate with the data service bean 330 on its host to ascertain the location of data service beans running on other hosts. Once the location of these data service beans is known, bean 326 can interact with the data services beans running on these other hosts in order to retrieve federated bean proxies of other SNDR beans that are running on the other hosts. The federated bean proxies are identifiers or "handles" that can be used by bean 326 to call appropriate methods in other SNDR beans, whose methods are necessary to perform different operations.

The steps in the process of locating data services in the system of FIG. 3 are illustrated in FIG. 4. This process begins in step 400 and proceeds to step 402 in which a client, for example, the GUI/CLI 324 first locates the local SNDR service implemented by the SNDR bean 326. In particular, the GUI/CLI 324 first obtains a proxy to the local DSS bean 330 using the conventional Jiro™ lookup service (not shown in FIG. 3.)

Next, in step 404, the local DSS bean proxy obtained in step 402 is used to retrieve a proxy to the local SNDR service implemented by bean 326. This proxy may be obtained by calling either the getServiceProxy(String service) method 212 (FIG. 2) and passing in the service name of the local SNDR service or by calling the getSNDRService( ) method 224 in bean 330.

In addition, the local DSS bean proxy can also be used by a client, such as SNDR bean 326, to retrieve an array of DSSTable objects that can be used to retrieve proxies of other DSS beans. In particular in step 406 a call is made to the getStationLookupInfo( ) method 208 in bean 330 by SNDR bean 326 in order to retrieve the table array.

Next, in step 408, information in an appropriate DSSTable object corresponding to another host, for example host 302, can be used to do a unicast lookup for DSS bean 336 on host 302.

Once bean 336 is located, as indicated in step 410, bean 326 can contact DSS bean 336 on host 302, via network 303, as indicated schematically by arrow 352, in order to retrieve a federated bean proxy to SNDR bean 334. Using this proxy bean 326 can then communicate directly with bean 334 by calling methods in bean 334 as indicated schematically by arrow 350 and in step 412. The process then finishes in step 414.

In a similar manner, bean 326 can contact DSS bean 342 on host 304, via network 303, as indicated schematically by arrow 354 in order to receive a federated bean proxy to SNDR bean 340. Using this proxy, bean 326 can then communicate directly with bean 340 by calling methods in bean 340 as indicated schematically by arrow 356.

Using federated bean proxies, as appropriate, a manager who controls bean 326 can also control SNDR beans running in other hosts to configure, control and monitor the SNDR data service layers in those hosts, via a management facade and a native interface as previously discussed, in order to locate, prepare and manage volumes in those hosts. This arrangement gives an administrator working with GUI/CLI 324 the capability of remotely managing data replication as opposed to the prior art mechanism of purely primary and secondary host-based management.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for finding a selected data service in a computer system having a distributed lookup service and a first host computer, the method comprising:
   (a) running a first federated bean in the first host computer, the first federated bean having a cache memory and a plurality of methods for retrieving information from the cache memory;
   (b) receiving in the first federated bean, for each data service that has registered with the distributed lookup service, a notification containing a proxy to the data service, the first federated bean thereupon storing the proxy in the cache memory;
   (c) using the distributed lookup service to locate the first federated bean; and
   (d) calling a method in the located first federated bean to retrieve from the cache memory a proxy to the selected data service.

2. The method of claim 1 wherein the computer system comprises a second host computer and the method further comprises:
   (e) registering a second federated bean in the second host computer with the distributed lookup service; and
   (f) receiving in the first federated bean a notification from the distributed lookup service, the notification containing information concerning a location of the second federated bean, the first federated bean thereupon storing the information in the cache memory.

3. The method of claim 2 wherein a second selected data service is available on the second host computer and wherein step (f) comprises receiving in the first federated bean a notification from the distributed lookup service, the notification containing a name of the second host computer and a location of a second lookup service containing a proxy to the second selected data service.

4. The method of claim 3 further comprising:
   (g) using the name of the second host computer and the location of a second lookup service to retrieve the proxy to the second selected data service; and
   (h) using the retrieved proxy to control the second selected data service.

5. The method of claim 4 wherein step (d) comprises calling a method in the located first federated bean to retrieve from the cache memory the information concerning the location of the second federated bean.

6. The method of claim 2 wherein step (f) comprises receiving in the first federated bean a notification from the distributed lookup service, the notification containing an object containing information for locating the second federated bean, the first federated bean thereupon storing the object in the cache memory.

7. The method of claim 1 wherein the method further comprises:
   (e) using the retrieved proxy to control the selected data service.

8. The method of claim 7 wherein the selected data service has an interface with a plurality of methods and wherein step (e) comprises using the retrieved proxy to call at least one of the plurality of methods in the interface.

9. Apparatus for finding a selected data service in a computer system having a distributed lookup service and a first host computer, the apparatus comprising:
   a first federated bean in the first host computer, the first federated bean having a cache memory and a plurality of methods for retrieving information from the cache memory;
   a listener that receives in the first federated bean, for each data service that has registered with the distributed lookup service, a notification containing a proxy to the data service, the first federated bean having a mechanism that stores the proxy in the cache memory;
   a mechanism that uses the distributed lookup service to locate the first federated bean; and
   a mechanism that calls a method in the located first federated bean to retrieve from the cache memory a proxy to the selected data service.

10. The apparatus of claim 9 wherein the computer system comprises a second host computer and the apparatus further comprises:
    a mechanism that registers a second federated bean in the second host computer with the distributed lookup service; and
    wherein the notification from the distributed lookup service contains information concerning a location of the second federated bean and wherein the first federated bean thereupon stores the information in the cache memory.

11. The apparatus of claim 10 wherein a second selected data service is available on the second host computer and wherein the notification from the distributed lookup service contains a name of the second host computer and a location of a second lookup service containing a proxy to the second selected data service.

12. The apparatus of claim 11 further comprising:
    a method in the first federated bean that uses the name of the second host computer and the location of a second lookup service to retrieve the proxy to the second selected data service; and
    a mechanism that uses the retrieved proxy to control the second selected data service.

13. The apparatus of claim 12 wherein the mechanism that calls a method in the located first federated bean to retrieve from the cache memory a proxy to the selected data service comprises a mechanism that calls a method in the located first federated bean to retrieve from the cache memory the information concerning the location of the second federated bean.

14. The apparatus of claim 10 wherein the notification from the distributed lookup service containing information concerning the location of the second federated bean contains an object containing information for locating the second federated bean and the first federated bean having a mechanism that stores the object in the cache memory.

15. The apparatus of claim 9 further comprising a mechanism that uses the retrieved proxy to control the selected data service.

16. The apparatus of claim 15 wherein the selected data service has an interface with a plurality of methods and wherein the mechanism that uses the retrieved proxy to control the selected data service comprises a mechanism that uses the retrieved proxy to call at least one of the plurality of methods in the interface.

17. A computer program product for finding a selected data service in a computer system having a distributed lookup service and a first host computer, the computer program product comprising a computer usable medium having computer readable program code thereon, including:

first federated bean program code operable in the first host computer, the first federated bean program code establishing a cache memory in the first host computer and having a plurality of methods for retrieving information from the cache memory;

program code that receives in the first federated bean, for each data service that has registered with the distributed lookup service, a notification containing a proxy to the data service, the first federated bean thereupon storing the proxy in the cache memory;

program code that uses the distributed lookup service to locate the first federated bean; and     program code that calls a method in the located first federated bean to retrieve from the cache memory a proxy to the selected data service.

18. The computer program product of claim 17 wherein the computer system comprises a second host computer and the computer program product further comprises:

program code that registers a second federated bean in the second host computer with the distributed lookup service; and     program code that receives in the first federated bean a notification from the distributed lookup service, the notification containing information concerning a location of the second federated bean, the first federated bean thereupon storing the information in the cache memory.

19. The computer program product of claim 18 wherein a second selected data service is available on the second host computer and wherein the notification containing information concerning a location of the second federated bean contains a name of the second host computer and a location of a second lookup service containing a proxy to the second selected data service.

20. The computer program product of claim 19 further comprising:

program code that uses the name of the second host computer and the location of a second lookup service to retrieve the proxy to the second selected data service; and     program code that uses the retrieved proxy to control the second selected data service.

21. A computer data signal embodied in a carrier wave embedded in a computer readable medium, wherein a processor reads the data signal in the medium and performs program code read from the data signal for finding a selected data service in a computer system having a distributed lookup service and a first host computer, the computer data signal comprising:

first federated bean program code operable in the first host computer, the first federated bean program code establishing a cache memory in the first host computer and having a plurality of methods for retrieving information from the cache memory;

program code that receives in the first federated bean, for each data service that has registered with the distributed lookup service, a notification containing a proxy to the data service, the first federated bean thereupon storing the proxy in the cache memory;

program code that uses the distributed lookup service to locate the first federated bean; and     program code that calls a method in the located first federated bean to retrieve from the cache memory a proxy to the selected data service.

22. Apparatus for finding a selected data service in a computer system having a distributed lookup service and a first host computer, the apparatus comprising:

first federated bean means in the first host computer, the first federated bean means having a cache memory and means for retrieving information from the cache memory;

means for receiving in the first federated bean, for each data service that has registered with the distributed lookup service, a notification containing a proxy to the data service, the first federated bean having means for storing the proxy in the cache memory;

means for using the distributed lookup service to locate the first federated bean; and     means in the located first federated bean for retrieving from the cache memory a proxy to the selected data service.

23. The apparatus of claim 22 wherein the computer system comprises a second host computer and the apparatus further comprises:

means for registering a second federated bean in the second host computer with the distributed lookup service; and     means for receiving in the first federated bean a notification from the distributed lookup service, the notification containing information concerning a location of the second federated bean, the first federated bean thereupon storing the information in the cache memory.

24. The apparatus of claim 23 wherein a second selected data service is available on the second host computer and wherein the notification from the distributed lookup service contains a name of the second host computer and a location of a second lookup service containing a proxy to the second selected data service.

25. The apparatus of claim 24 further comprising:

means in the first federated bean for using the name of the second host computer and the location of a second lookup service to retrieve the proxy to the second selected data service from the cache memory; and     means for using the retrieved proxy to control the second selected data service.

26. The apparatus of claim 25 wherein the means for retrieving from the cache memory in the first federated bean a proxy to the selected data service comprises means for calling a method in the located first federated bean to retrieve from the cache memory the information concerning the location of the second federated bean.

27. The apparatus of claim 23 wherein the notification from the distributed lookup service containing information concerning the location of the second federated bean contains an object containing information for locating the second federated bean and the first federated bean comprises means for storing the object in the cache memory.

28. The apparatus of claim 22 further comprising means for using the retrieved proxy to control the selected data service.

29. The apparatus of claim 28 wherein the selected data service has an interface with a plurality of methods and wherein means for using the retrieved proxy to control the selected data service comprises means for using the retrieved proxy to call at least one of the plurality of methods in the interface.

* * * * *